United States Patent
Jeon

(10) Patent No.: US 10,746,061 B1
(45) Date of Patent: Aug. 18, 2020

(54) HYDRAULIC TYPE SCISSORS GEAR

(71) Applicants: Hyundai Motor Company, Seoul (KR); Kia Motors Corporation, Seoul (KR)

(72) Inventor: Jae Hee Jeon, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/519,637

(22) Filed: Jul. 23, 2019

(30) Foreign Application Priority Data

Feb. 20, 2019 (KR) .................. 10-2019-0019630

(51) Int. Cl.
| | |
|---|---|
| *F01L 1/02* | (2006.01) |
| *F01L 1/053* | (2006.01) |
| *F16H 55/18* | (2006.01) |
| *F01L 1/46* | (2006.01) |

(52) U.S. Cl.
CPC ............ *F01L 1/053* (2013.01); *F01L 1/462* (2013.01); *F16H 55/18* (2013.01); *F01L 2001/0537* (2013.01); *F01L 2810/04* (2013.01)

(58) Field of Classification Search
CPC ... F01L 1/053; F01L 1/462; F01L 2001/0537; F01L 2810/04; F16H 55/18
See application file for complete search history.

(56) References Cited

U.S. PATENT DOCUMENTS 4,072,064 A * 2/1978 Lloyd .................... F16H 55/18
74/409

FOREIGN PATENT DOCUMENTS

KR    10-2008-0110080 A    12/2008

* cited by examiner

*Primary Examiner* — Zelalem Eshete
(74) *Attorney, Agent, or Firm* — Morgan, Lewis & Bockius LLP

(57) ABSTRACT

A hydraulic type scissors gear may include a first gear having a working chamber formed therein and oil supplied into the working chamber; a second gear provided to be relatively rotatable coaxially with a side surface of the first gear; and a piston supplied with the oil supplied into the working chamber, and moved in the working chamber by pressure of the oil supplied thereinto to apply a force that pushes the second gear in a rotation direction opposite to a rotation direction of the first gear to rotate the second gear.

10 Claims, 8 Drawing Sheets

HYDRAULIC TYPE SCISSORS GEAR

CROSS REFERENCE TO RELATED APPLICATION

The present application claims priority to Korean Patent Application No. 10-2019-0019630, filed Feb. 20, 2019, the entire contents of which is incorporated herein for all purposes by this reference.

BACKGROUND OF THE INVENTION

Field of the Invention

The present invention relates to a hydraulic type scissors gear for removing an occurrence cause of backlash due to a reduction in tension of an existing spring by a relative motion between gears performed by oil pressure.

Description of Related Art

A scissors gear is a gear that has an auxiliary gear having the same number of gear teeth disposed on a side surface of a main gear and removes a backlash by tightly fitting the gear teeth of the other gear to which the gear teeth are engaged.

That is, when there is a backlash in the engaged portion of the gear, backlash noise occurs in which the gear teeth collide with each other whenever a rotational variation of an engine occurs.

Therefore, the backlash noise occurring between two gears is prevented by applying a force in a direction in which a rotational force of the two gears acts and in an opposite direction using a spring.

A configuration of a conventional scissors gear will be briefly described with reference to FIG. 1. A second gear 2 is provided onto a side surface of a first gear 1 and pins 1a and 2a are coupled to facing surfaces of the first gear 1 and the second gear 2, respectively. Furthermore, both end portions of a ring-shaped scissors spring 3 are supported in a tension state by the pin of the first gear and the pin of the second gear, respectively, so that the second gear is relatively rotatable relative to the first gear.

That is, the second gear is relatively rotated with respect to a rotational motion of the first gear by an elastic force of the scissors spring so that a backlash between the gear teeth of the first gear and the gear teeth of the second gear is removed, and as a result, rattle noise does not occur while driving of a vehicle.

However, since the conventional scissors gear using the scissors spring and pin structure has a relatively small contact area between the scissors spring and the pins supporting the scissors spring, an excessive load is applied to the pins, which causes the pins to wear.

Accordingly, the pins are worn out, which leads to reduce tension of the scissors spring, and as a result, the backlash occurs, which causes the rattle noise of the gear to occur.

The contents referred to as the related art have been provided only to assist in understanding the background of the present invention and may not be considered as corresponding to the related art known to those having ordinary skill in the art.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hydraulic type scissors gear for removing an occurrence cause of backlash due to a change in tension of an existing spring by a relative motion between gears performed by oil pressure.

According to an exemplary embodiment of the present invention, a hydraulic type scissors gear may include: a first gear having a working chamber formed therein and oil supplied into the working chamber; a second gear provided to be relatively rotatable coaxially with the first gear; and a piston supplied with the oil supplied into the working chamber, and moved in the working chamber by pressure of the oil supplied thereinto to apply a force that pushes the second gear in a rotation direction opposite to a rotation direction of the first gear to rotate the second gear.

The piston may be provided to be moved in a direction perpendicular to a radial direction of the first gear, and a supporting portion may be formed in a radial direction of the second gear, and the supporting portion may be positioned to face the piston such that the movement of the piston pushes the supporting portion.

The piston may be provided to protrude toward the second gear at a predetermined radial position of the first gear and face the supporting portion.

The piston may be provided in the working chamber, an end portion of the working chamber may be opened, and a guide groove may be formed in the supporting portion facing the end portion of the working chamber so that a portion of the piston moved toward the end portion of the working chamber is inserted thereinto.

An oil lubricating hole may be formed in one end portion of the piston and the oil supplied into the piston may be supplied to a portion at which the piston and the supporting portion are in contact with each other through the oil lubricating hole.

An oil inflow portion may be formed in a middle end portion of the working chamber; the oil supplied from the oil inflow portion may be supplied into the piston and push one end portion in the piston so that one end portion of the piston may be moved toward one end portion of the working chamber; an oil flow hole may be formed in the other end portion of the piston; an oil accommodating space may be formed between the other end portion of the piston and the other end portion of the working chamber to accommodate the oil introduced into the piston; and a check valve mechanism may be movably provided in the oil accommodating space and the oil flow hole may be opened or closed depending on a position of the check valve mechanism.

The check valve mechanism may include: a check plate having a seating portion which is formed along an edge portion thereof and supported by the other end portion of the piston; and a check plate spring providing an elastic restoring force to the check plate so that the check plate is moved in a direction supported by the other end portion of the piston.

The hydraulic type scissors gear may further include: a ball accommodating groove formed in the center portion of the check plate; a check ball accommodated in the ball accommodating groove, and having a portion of a spherical surface thereof supported by an edge portion of an internal surface of the oil flow hole to open or close the oil flow hole;

and a check ball spring providing the elastic restoring force to the check ball so that the check ball is moved in a direction supported by the internal surface of the oil flow hole.

Both end portions of the check plate spring may be supported between the seating portion and an internal surface of the other end portion of the working chamber; and both end portions of the check ball spring may be supported between the check ball and an internal surface of the ball accommodating groove.

A flange may be formed on an external surface of the other end portion of the piston which is connected to the oil flow hole; the seating portion formed on the check plate may be brought into close contact with the flange; and an oil passing groove may be formed along an edge portion of the seating portion so that the oil may be introduced into the oil accommodating space through the oil passing groove.

The first gear may be mounted to a camshaft; a shaft oil passage may be formed in the camshaft; a gear oil passage may be formed in the first gear to communicate with the shaft oil passage; and the gear oil passage may communicate with the internal to the working chamber, so that the oil flowing through the gear oil passage may be supplied into the working chamber.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
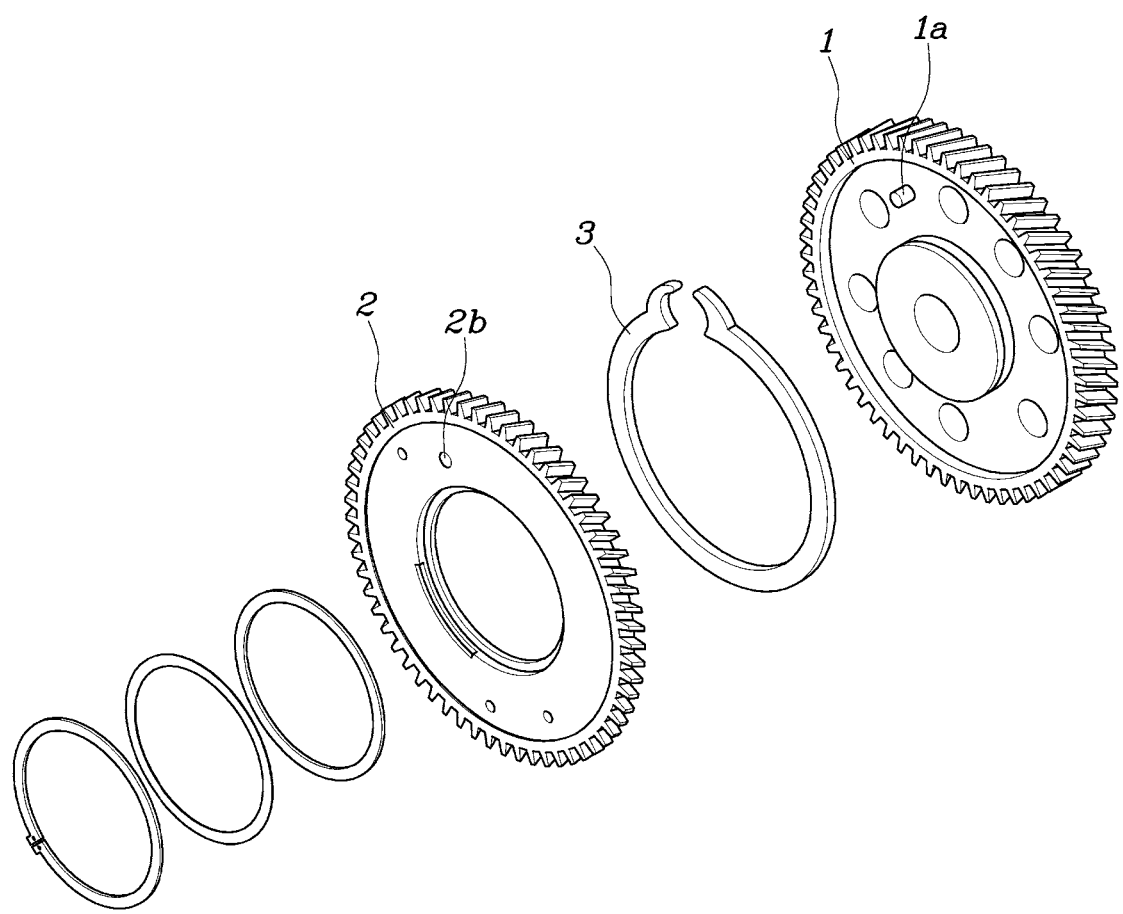
FIG. 1 is a view that separately shows portions forming an existing mechanical scissors gear.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Embodiments of the present invention will be described in detail with reference to the accompanying drawings.

A hydraulic type scissors gear according to an exemplary embodiment of the present invention includes a first gear 10, a second gear 20, and a piston 30.

The present invention will be described in detail with reference to FIGS. 2, 3, and 5. First, the first gear 10 is a main gear coupled to a camshaft 80, and has a working chamber 11 formed in the first gear 10 and oil supplied into the working chamber 11.

The second gear 20 is an auxiliary gear coupled to a side surface of the first gear 10, and is provided to be relatively rotatable coaxially with the first gear 10.

Furthermore, the piston 30 is supplied with the oil supplied into the working chamber 11, and is moved in the working chamber 11 by pressure of the oil supplied thereinto to apply a force that pushes the second gear 20 in a rotation direction opposite to a rotation direction of the first gear 10, rotating the second gear 20.

That is, the gear teeth of the first gear 10 and the gear teeth of the second gear 20 are slightly dislocated with each other by relatively rotating the second gear 20 in the direction opposite to the rotation direction of the first gear 10 by the applied pressure of the piston 30 moved by the oil pressure, and as a result, a backlash between the gears engaged with the first gear 10 and the second gear 20 is removed, reducing gear rattle noise.

Since an existing recurrence cause of backlash due to a reduction in tension of the scissors spring and a wear of the pins is basically blocked by relatively rotating the second gear 20 with a hydraulic method using the oil pressure according to an exemplary embodiment of the present invention instead of an existing mechanical method that relatively rotates the second gear 20 using the tension of the scissors spring, it is possible to implement a backlash removal system which may be continuously and stably used for a long time period.

Figure 4:
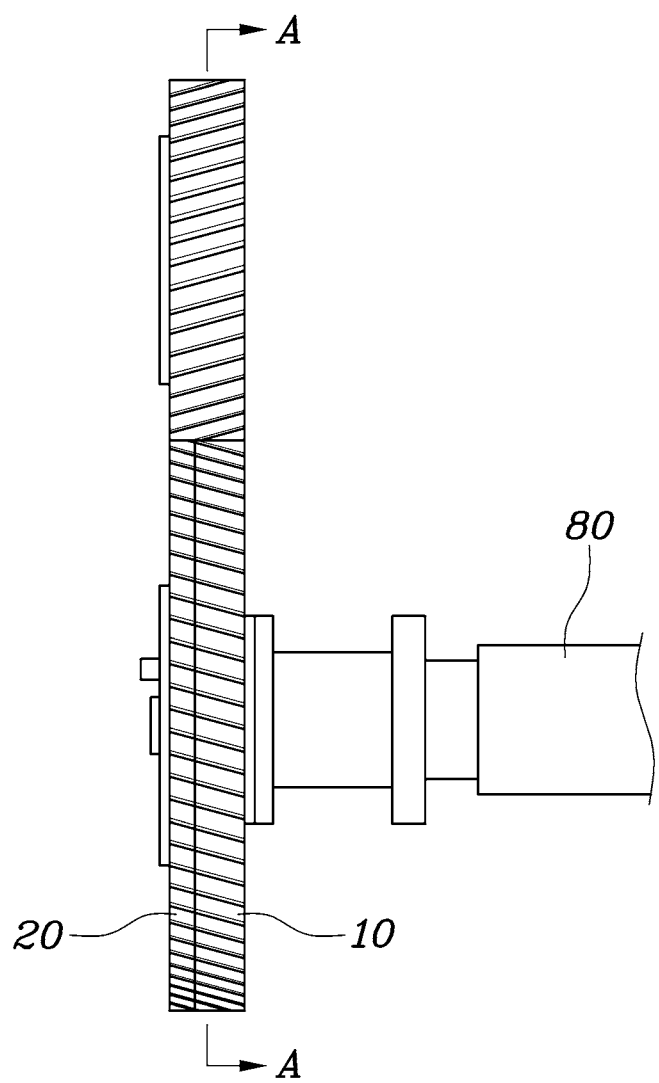
FIG. 4 is a view a state in which the scissors gear according to an exemplary embodiment of the present invention is engaged with another gear.

Meanwhile, a configuration of an exemplary embodiment in which the piston 30 pushes the second gear 20 will be described with reference to FIG. 4 and FIG. 5. According to an exemplary embodiment of the present invention, the piston 30 is provided to be moved in a direction perpendicular to a radial direction of the first gear 10.

Furthermore, a supporting portion 21 is integrally formed in a radial direction of the second gear 20, and the supporting portion 21 is positioned to face the piston 30 such that the movement of the piston 30 pushes the supporting portion 21.

That is, when the piston 30 is linearly moved by the oil pressure, the supporting portion 21 is provided at a position to which the piston 30 is moved so that the piston 30 pushes the supporting portion 21 and the second gear 20 rotates together with the supporting portion 21 about an axis thereof.

Figure 2:
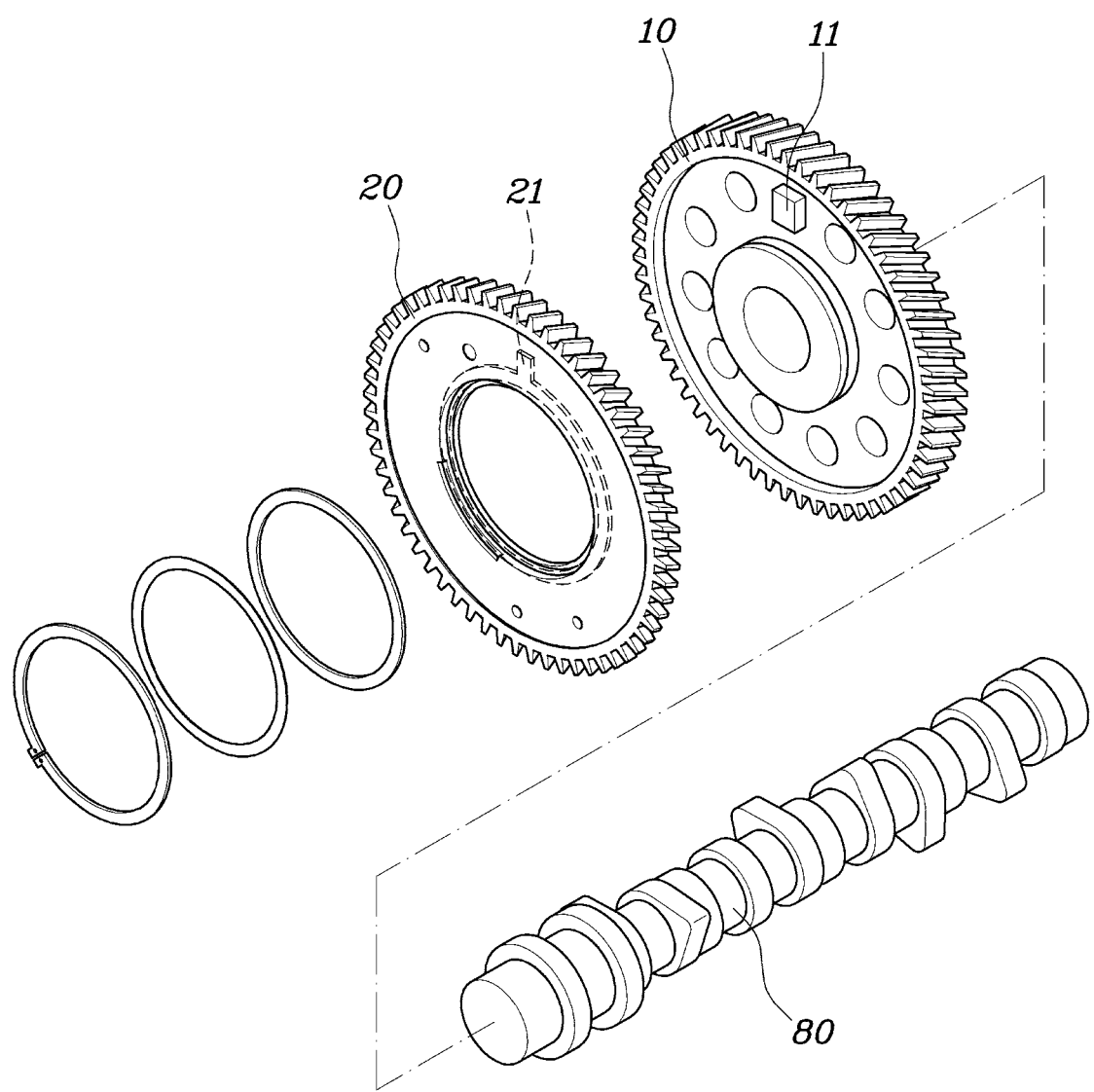
FIG. 2 is a view that separately shows portions forming a hydraulic type scissors gear according to an exemplary embodiment of the present invention.
Figure 5:
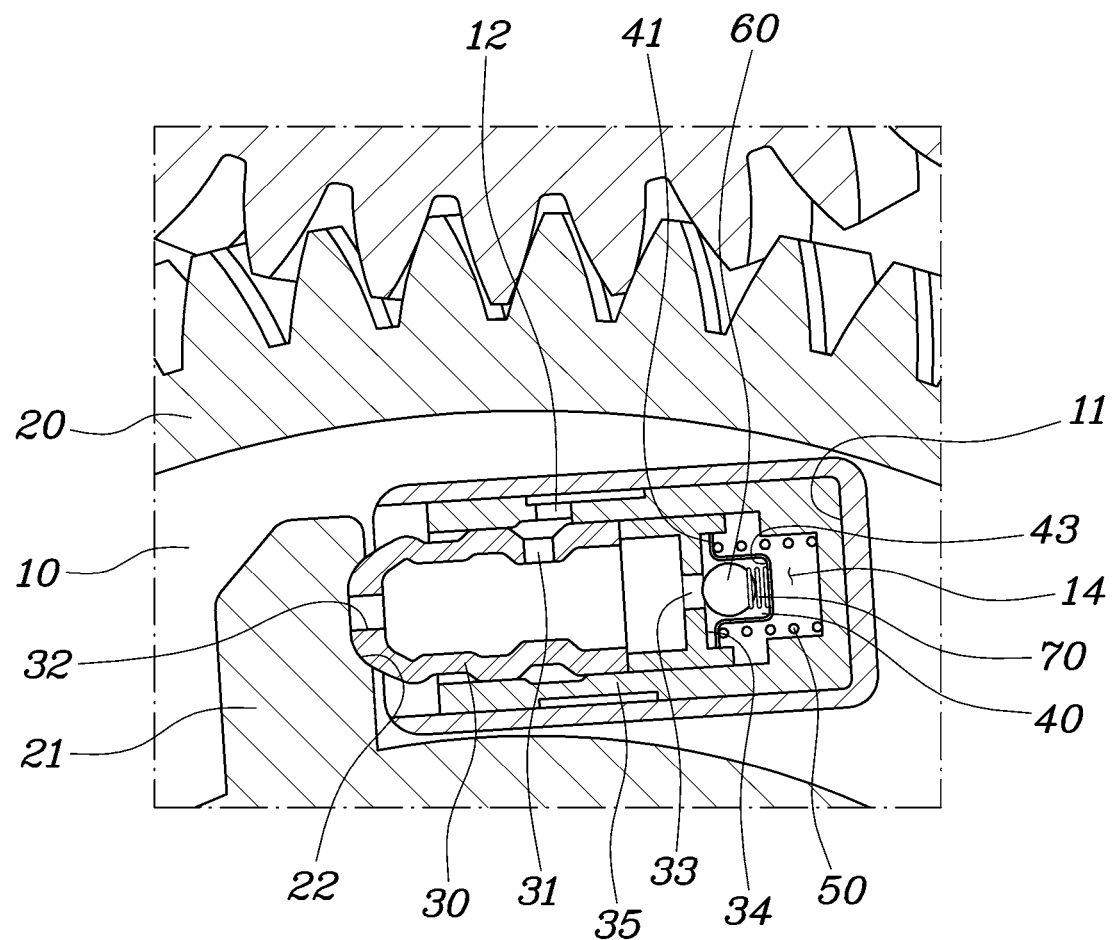
FIG. 5 is a partially enlarged view of a cross section taken along a line A-A of FIG. 4.

Furthermore, as shown in FIGS. 2 and 5, the piston 30 is provided to protrude toward the second gear 20 at a predetermined radial position of the first gear 10. For example, the working chamber 11 is formed to protrude toward the second gear 20 at the predetermined radial position of the first gear 10, and the piston 30 moved within the working chamber 11 is also thus provided at a position protruding toward the second gear 20.

Therefore, the piston 30 faces the supporting portion 21 so that the supporting portion 21 may be pushed according to the movement of the piston 30.

Furthermore, as shown in FIG. 5, according to an exemplary embodiment of the present invention, a structure in which the piston 30 can stably push the support portion 21 may be added.

To the present end, according to an exemplary embodiment of the present invention, a structure is formed in which the piston 30 is provided in the working chamber 11 and an end portion of the working chamber 11 is opened. Here, according to an exemplary embodiment of the present invention, although it is shown that a piston case 35 is embedded in the working chamber 11 and the piston 30 is provided in the piston case 35, the piston 30 may also be directly provided in the working chamber 11 without the piston case.

Furthermore, a guide groove 22 is formed in the supporting portion 21 facing the open end portion of the working chamber 11 so that a portion of the piston 30 moved toward the end portion of the working chamber 11 is inserted thereinto. In the instant case, the end portion of the piston 30 inserted into the guide groove 22 is formed in a shape corresponding to the guide groove 22, or is formed to have a slightly smaller cross-sectional area than the guide groove 22, so that the end portion of the piston 30 may be stably inserted into the guide groove 22 and press the supporting portion 21.

According to the configuration as described above, in an exemplary embodiment of the present invention, the end portion of the piston 30 is inserted into the guide groove 22 and is in surface-contact with the supporting portion 21, and as a result, since a contact area for applying a force to push the second gear 20 is increased and a load to be pressed is not concentrated on any one portion, a portion wear phenomenon due to the load concentration may be prevented and the backlash may be stably and continuously removed.

Furthermore, according to an exemplary embodiment of the present invention, to lubricate a portion at which the piston 30 and the supporting portion 21 are in contact with each other, the oil supplied into the piston 30 may be directly supplied to the contact portion.

To the present end, an oil lubricating hole 32 having a cross-sectional area smaller than the cross-sectional area of an internal space of the piston 30 is formed in one end portion of the piston 30. Therefore, the oil supplied into the piston 30 is directly supplied to the portion at which the piston 30 and the supporting portion 21 are in contact with each other through the oil lubricating hole 32, improving a lubrication performance to improve wear resistance of the parts.

Meanwhile, according to an exemplary embodiment of the present invention, the hydraulic type scissors gear further includes a check valve mechanism for maintaining pressure of the oil supplied into the working chamber 11.

The above-mentioned configuration will be described with reference to FIGS. 3 and 5. An oil inflow portion 12 is formed in one end portion of the working chamber 11 and an oil supplying hole 31 is formed in a middle end portion of the piston 30.

Therefore, the oil supplied from the oil inflow portion 12 is supplied into the piston 30 through the oil supplying hole 31 and pushes one end portion in the piston 30 so that one end portion of the piston 30 is moved to one end portion of the working chamber 11.

Furthermore, an oil flow hole 33 is formed in the other end portion of the piston 30 and an oil accommodating space 14 is formed between the other end portion of the piston 30 and the other end portion of the working chamber 11, so that the oil introduced into the piston 30 is accommodated in the oil accommodating space 14.

Furthermore, the check valve mechanism is movably provided in the oil accommodating space 14, and the oil flow hole 33 is opened or closed depending on a position of the check valve mechanism.

That is, the piston 30 pushes the supporting portion 21 formed on the second gear 20 by the pressure of the oil supplied into the piston 30 to thereby rotate the second gear 20.

In a process of rotating the second gear 20 as described above, the oil supplied into the piston 30 flows into the other end portion of the piston 30 and is introduced into the oil accommodating space 14 through the oil flow hole 33.

Therefore, the oil flow hole 33 is closed according to an operation of the check valve mechanism in a state in which the oil is filled in the oil accommodating space 14. Therefore, since the piston 30 may maintain the force of pushing the supporting portion 21 of the second gear 20 by the oil filled in the oil flow hole 33 as it is, a gear backlash removing action may be continuously and stably maintained.

As an exemplary embodiment of the check valve mechanism applied to the present invention, the check valve mechanism includes a check plate 40 and a check plate spring 50.

A detailed description will be made with reference to the drawings. The check plate 40 has a seating portion 41 formed along an edge portion thereof and the seating portion 41 is supported by the other end portion of the piston 30.

Furthermore, the check plate spring 50 that provides an elastic restoring force to the check plate 40 is provided so that the check plate 40 is moved in a direction supported by the other end portion of the piston 30.

That is, when the piston 30 pushes the check plate 40 against a spring force of the check plate spring 50 by the pressure of the oil supplied into the piston 30, the oil may be supplied into the oil accommodating space 14. Next, when the oil is accommodated and filled in the oil accommodating space 14 and the pressure of the oil is stabilized, the check plate 40 may be restored and moved by the elastic restoring force of the check plate spring 50 to block the oil flow hole 33.

However, according to an exemplary embodiment of the present invention, the hydraulic type scissors gear may further include a ball accommodating groove 43, a check ball 60, and a check ball spring 70, as components forming the check valve mechanism.

A description will be made in detail with reference to the drawings. The ball accommodating groove 43 is formed in the center portion of the check plate 40. In the instant case, a concave portion of the ball accommodating groove 43 is provided to be directed to the oil flow hole 33.

Furthermore, the check ball 60 is accommodated in the ball accommodating groove 43, and a portion of a spherical surface of the check ball 60 is supported by an edge portion of an internal surface of the oil flow hole 33 to open or close the oil flow hole 33.

Furthermore, the check ball spring 70 that provides an elastic restoring force to the check ball 60 is provided so that the check ball 60 is moved in a direction supported by the internal surface of the oil flow hole 33.

Figure 8:
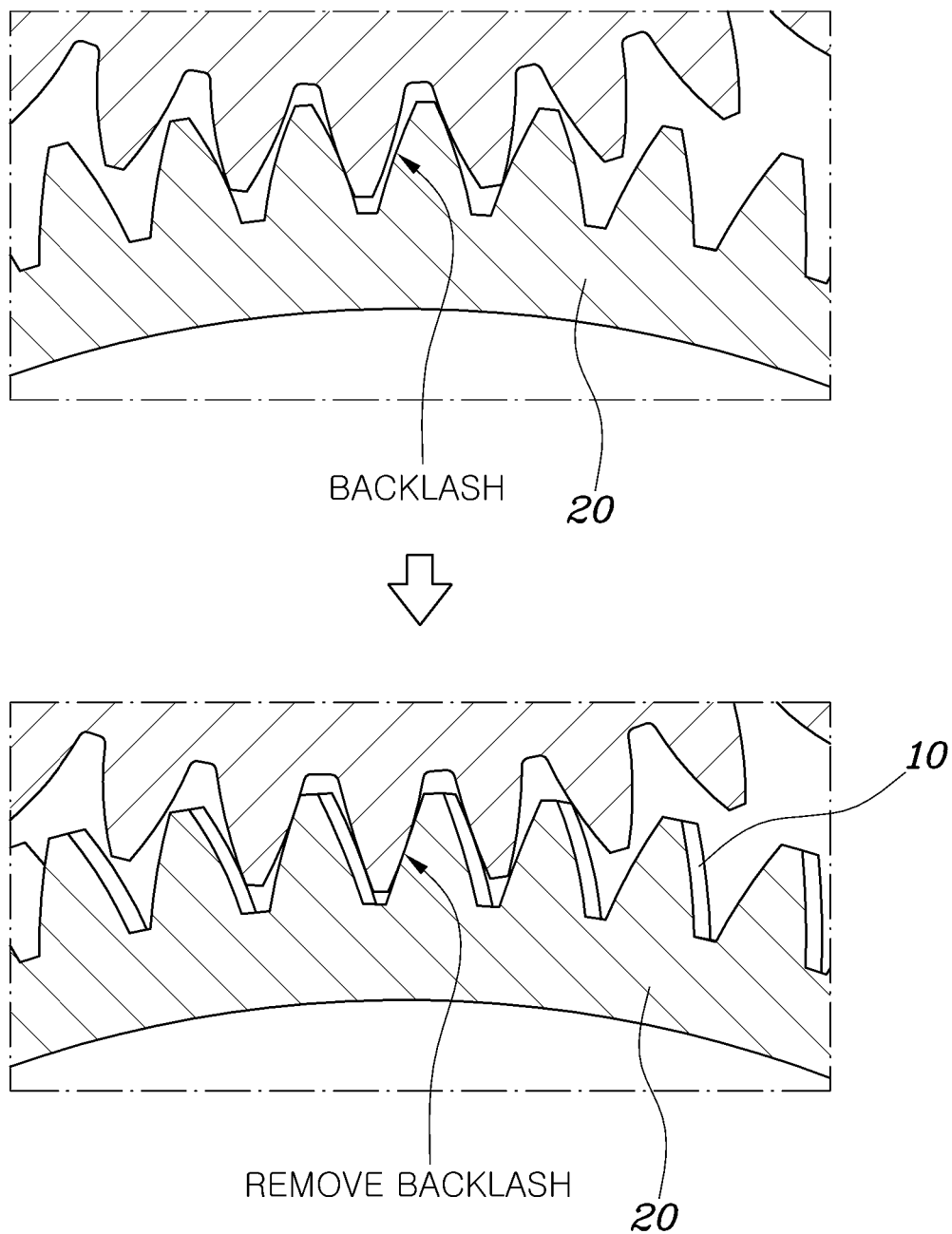
FIG. 8 is a view showing a gear engagement state before and after backlash removal according to an exemplary embodiment of the present invention.

That is, as in a left figure of FIG. 8, in a state in which the backlash is present between the scissors gear and a gear engaged with the scissors gear, when the oil is supplied into the piston 30 through the oil inflow portion 12, the piston 30 is moved toward the supporting portion 21 to push the supporting portion 21, rotating the second gear 20 together with the supporting portion 21, and at the same time, since the oil in the piston 30 pushes the check ball 60 against a spring force of the check ball spring 70 and a spring force of the check plate spring 50, the oil flow hole 33 is opened as shown in FIG. 5.

Figure 6:
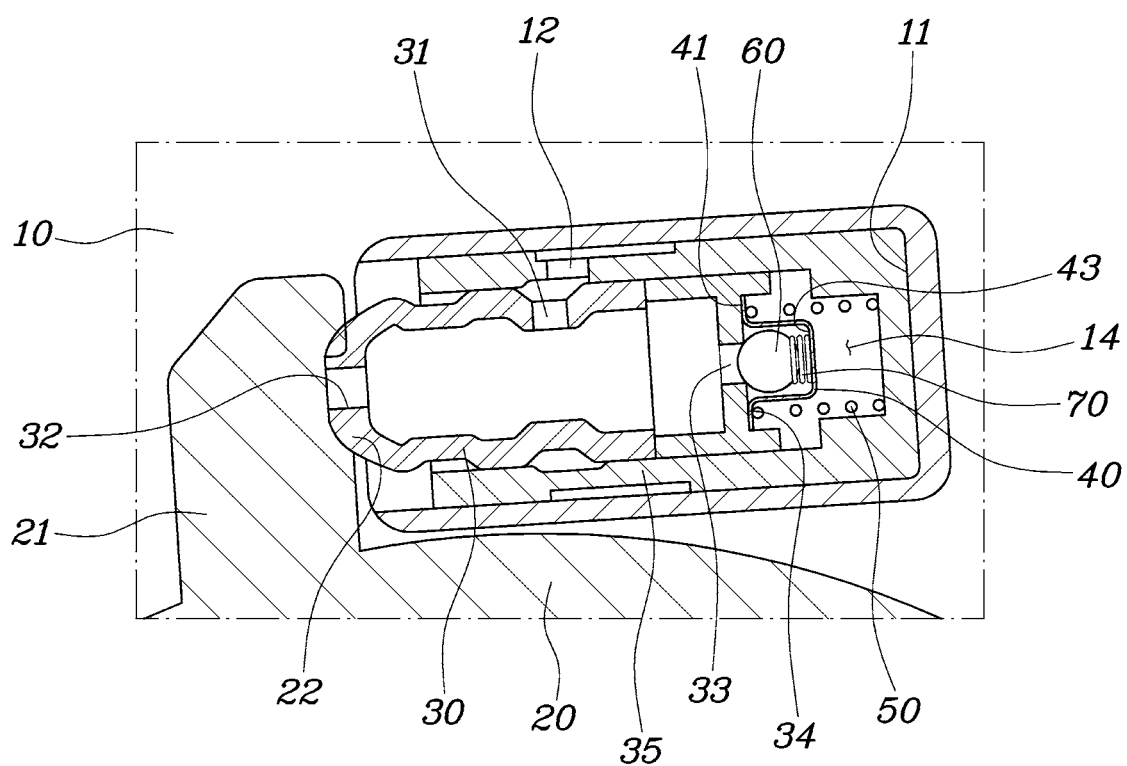
FIG. 6 is a view showing a state in which a closed space in which oil is accommodated in an oil accommodation space is formed In an exemplary embodiment of the present invention.
Figure 7:
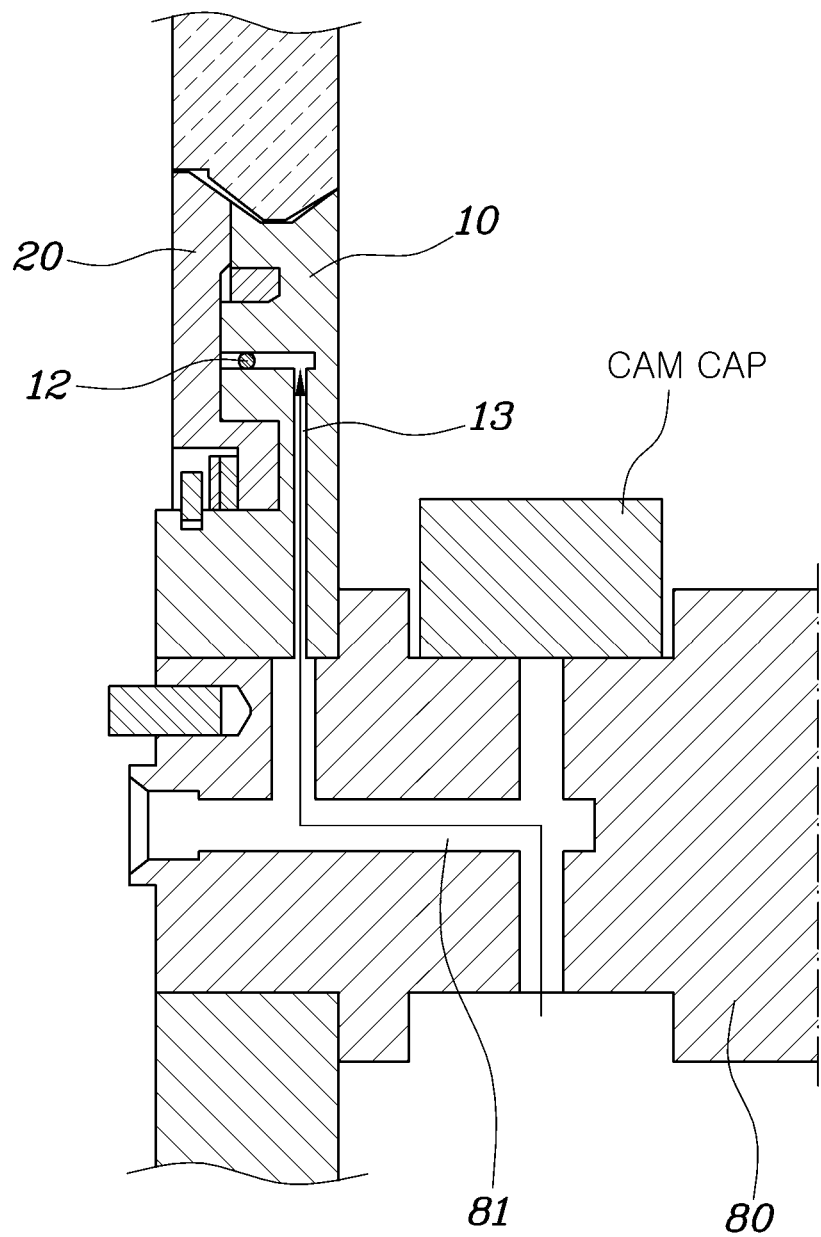
FIG. 7 is a view for describing a configuration for supplying oil to a working chamber In an exemplary embodiment of the present invention.

Therefore, the oil is accommodated in the oil accommodating space 14 through the oil flow hole 33, and after the pressure of the oil accommodated in the oil accommodating space 14 is maintained in equilibrium, the check ball 60 is restored and moved together with the check plate 40 by the elastic restoring force of the check plate spring 50 and the check ball spring 70 to close the oil flow hole 33 as shown in FIG. 6.

As a result, in the oil accommodating space 14, a closed space filled with the oil may be formed and a state in which the second gear 20 is rotated may be maintained as it is.

Accordingly, as in a right figure of FIG. 8, the backlash between the scissors gear according to an exemplary embodiment of the present invention and the gear engaged with the scissors gear is removed by a slight dislocation arrangement of the first gear 10 and the second gear 20, and an occurrence of the gear rattle noise is thus prevented.

Furthermore, according to an exemplary embodiment of the present invention, both end portions of the check plate spring 50 are supported between the seating portion 41 and an internal surface of the other end portion of the working chamber 11, and both end portions of the check ball spring 70 are supported between the check ball 60 and an internal surface of the ball accommodating groove 43.

That is, by applying a double spring of the check plate spring 50 and the check ball spring 70 as a component that provides a force to close the oil flow hole 33, since airtightness of the oil accommodating space 14 is greatly improved, the backlash removing action may be more stably performed, and also since a cross-sectional area of the check ball 60 closing the oil flow hole 33 is small and responsiveness of the opening and closing operation is thus improved, the backlash removing action may be more rapidly performed.

Furthermore, according to an exemplary embodiment of the present invention, a structure for allowing the oil introduced into the piston 30 to flow smoothly into the oil accommodating space 14 may be further provided.

Figure 3:
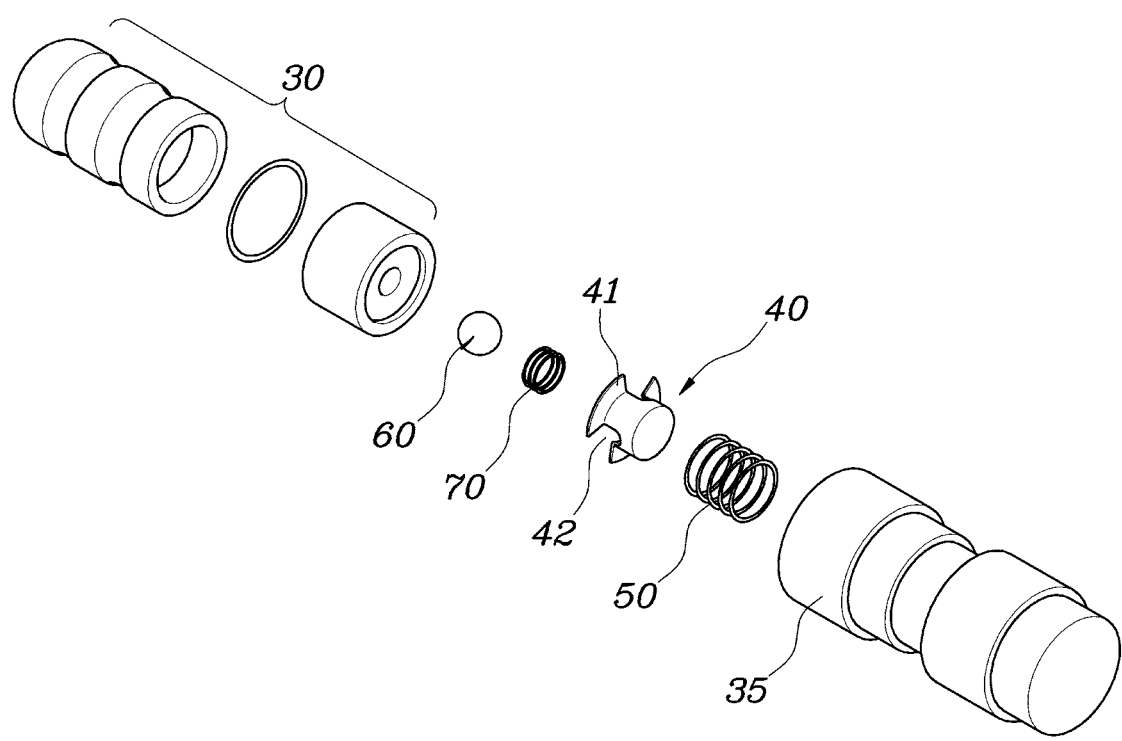
FIG. 3 is a view that separately shows components for a movement operation of a piston according to an exemplary embodiment of the present invention.

To the present end, according to an exemplary embodiment of the present invention, as shown in FIGS. 3 and 5, a flange 34 is formed on an external surface of the other end portion of the piston 30 which is connected to the oil flow hole 33, and the seating portion 41 formed on the check plate 40 is brought into close contact with the flange 34.

Therefore, a plurality of oil passing grooves 43 having a concave arc shape are formed along an edge portion of the seating portion 41 so that the oil may be stably introduced into the oil accommodating space 14 through the oil passing grooves 42.

Meanwhile, according to an exemplary embodiment of the present invention, the oil supplied from the cylinder head may be supplied into the working chamber 11.

To the present end, as shown in FIG. 8, according to an exemplary embodiment of the present invention, the first gear 10 is mounted to a camshaft 80 and a shaft oil passage 81 is formed in the camshaft 80, and the oil supplied from a cylinder head may be supplied to the shaft oil passage 81. In the instant case, a cam cap may be coupled to a portion of the camshaft 80 corresponding to the shaft oil passage 81.

Furthermore, a gear oil passage 13 is formed in the first gear 10 to communicate with the shaft oil passage 81 and the gear oil passage 13 communicates with the internal to the working chamber 11, so that the oil flowing through the gear oil passage 13 may be supplied into the working chamber 11.

That is, when the oil supplied from the cylinder head is introduced into the shaft oil passage 81, the oil introduced into the shaft oil passage 81 is introduced into the gear oil passage 13 formed in the first gear 10 and the oil introduced into the gear oil passage 13 is introduced into the oil inflow portion 12 formed in the middle end portion of the working chamber 11, making it possible to supply the oil to the working chamber 11.

Accordingly, the supporting portion 21 may be pushed by moving the piston 30 by the pressure of the oil supplied to the piston 30 through the working chamber 11, and as a result, the backlash between the gear teeth of the first gear 10 and the second gear 20 and the other gear engaged therewith is removed by relatively rotating the second gear 20 together with the supporting portion 21 with respect to the first gear 10.

According to an exemplary embodiment of the present invention, since an existing recurrence cause of backlash due to the reduction in the tension of the scissors spring and the wear of the pins is basically blocked by relatively rotating the second gear with the hydraulic method using the oil pressure instead of an existing mechanical method that relatively rotates the second gear using the tension of the scissors spring, it is possible to implement a backlash removal system which may be continuously and stably used for a long time period.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A hydraulic type scissors gear apparatus comprising:
a first gear having a working chamber formed therein, wherein oil is configured to be supplied into the working chamber;
a second gear coaxially provided with the first gear and relatively rotatable with the first gear; and
a piston mounted in the first gear and configured to be supplied with the oil supplied into the working chamber,
wherein the piston is moved in the working chamber by pressure of the oil supplied into the working chamber to apply a force that pushes the second gear in a rotation direction opposite to a rotation direction of the first gear, to rotate the second gear,
wherein the piston is provided to be moved in a direction perpendicular to a radial direction of the first gear, and
wherein a supporting portion is formed on the second gear in a radial direction of the second gear, and the supporting portion is positioned to face a first end portion of the piston such that the piston pushes the supporting portion when the oil is supplied in the working chamber.

2. The hydraulic type scissors gear apparatus of claim 1, wherein the piston is provided to protrude toward the supporting portion of the second gear at a predetermined radial position of the first gear and faces the supporting portion.

3. The hydraulic type scissors gear apparatus of claim 1, wherein the piston is slidably provided in the working chamber,
wherein a first end portion of the working chamber is opened, and
wherein a guide groove is formed in an end portion of the supporting portion facing the first end portion of the working chamber so that the first end portion of the piston moved toward the first end portion of the working chamber is inserted into the guide groove.

4. The hydraulic type scissors gear apparatus of claim 1, wherein an oil lubricating hole is formed in the first end portion of the piston and the oil supplied into the piston is supplied to a place at which the first end portion of the piston and an end portion of the supporting portion are in contact with each other, through the oil lubricating hole.

5. The hydraulic type scissors gear apparatus of claim 1, wherein an oil inflow portion is formed in a predetermined portion of the working chamber having a first end portion and a second end portion;
wherein the oil supplied from the oil inflow portion is supplied into the piston having the first end portion and a second end portion and pushes the second end portion of the piston so that the first end portion of the piston is moved toward the second end portion of the working chamber;
wherein an oil flow hole is formed in the second end portion of the piston;
wherein an oil accommodating space is formed between the second end portion of the piston and the second end portion of the working chamber to accommodate the oil introduced into the piston through the oil supplying hole, in the oil accommodating space; and
wherein a check valve mechanism is provided in the oil accommodating space and the oil flow hole is opened or closed by the check valve mechanism.

6. The hydraulic type scissors gear apparatus of claim 5, wherein the check valve mechanism includes:
a check plate having a seating portion which is formed along an edge portion of the check plate and supported by the second end portion of the piston; and
a check plate spring providing an elastic restoring force to the check plate so that the check plate is elastically biased in a direction supported by the second end portion of the piston.

7. The hydraulic type scissors gear apparatus of claim 6, further including:
a ball accommodating groove formed in a center portion of the check plate;
a check ball accommodated in the ball accommodating groove, and having a portion of a spherical surface thereof supported by an edge portion of an internal surface of the oil flow hole to open or close the oil flow hole; and
a check ball spring providing an elastic restoring force to the check ball so that the check ball is elastically biased in a direction supported by the internal surface of the oil flow hole.

8. The hydraulic type scissors gear apparatus of claim 7, wherein a first end portion and a second end portion of the check plate spring are supported between the seating portion and an internal surface of the second end portion of the working chamber; and
wherein a first end portion and a second end portion of the check ball spring are supported between the check ball and an internal surface of the ball accommodating groove.

9. The hydraulic type scissors gear apparatus of claim 7, wherein a flange is formed on an external surface of the second end portion of the piston which is connected to the oil flow hole;
wherein the seating portion formed on the check plate is brought into contact with the flange; and
wherein an oil passing groove is formed along an edge portion of the seating portion so that the oil is introduced into the oil accommodating space through the oil passing groove.

10. The hydraulic type scissors gear apparatus of claim 1, wherein the first gear is mounted to a camshaft;
wherein a shaft oil passage is formed in the camshaft;
wherein a gear oil passage is formed in the first gear to fluidically-communicate with the shaft oil passage; and
wherein the gear oil passage fluidically-communicates with an internal of the working chamber, so that the oil flowing through the gear oil passage is supplied into the working chamber.

* * * * *